United States Patent
Kue et al.

(10) Patent No.: US 9,328,705 B2
(45) Date of Patent: May 3, 2016

(54) DIESEL FUEL GELLING DETERMINATION METHOD

(71) Applicant: Ford Global Technologies, LLC, Dearborn, MI (US)

(72) Inventors: Ace Koua Kue, Franklin, MI (US); John Paul Bogema, Flat Rock, MI (US); Lohpartap Ahluwalia, Shelby Township, MI (US); Dennis Blanchard, Canton, MI (US); William P. Boone, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/444,792

(22) Filed: Jul. 28, 2014

(65) Prior Publication Data

US 2016/0025049 A1    Jan. 28, 2016

(51) Int. Cl.
*G01M 17/00* (2006.01)
*F02M 37/22* (2006.01)
*B60K 35/00* (2006.01)
*B60W 40/02* (2006.01)

(52) U.S. Cl.
CPC ............... *F02M 37/22* (2013.01); *B60K 35/00* (2013.01); *B60W 40/02* (2013.01); *B60K 2350/1076* (2013.01); *B60W 2550/12* (2013.01)

(58) Field of Classification Search
CPC .............................................. B60K 2015/03348
See application file for complete search history.

(56) References Cited

U.S. PATENT DOCUMENTS

2010/0033372 A1\* 2/2010 Pryor ................. G08G 1/127
                                                    342/357.31
2014/0121936 A1   5/2014 Fulton et al.

FOREIGN PATENT DOCUMENTS

| EP | 319597 A1 | 6/1989 |
| JP | 2013068195 A | 4/2013 |
| WO | 2012169957 A1 | 12/2012 |

\* cited by examiner

*Primary Examiner* — Michael D Lang
(74) *Attorney, Agent, or Firm* — James Dottavio; Alleman Hall McCoy Russell & Tuttle LLP (57) ABSTRACT

Fuel gelling determination methods and systems are provided for identifying and displaying to a vehicle operator a message conveying that the conditions are suitable for the formation of a fuel gel. In one particular example, at a fuel refill event the average ambient air temperature is calculated over the last fifty miles and used to characterize the grade of fuel as a summer or winter grade of fuel. Then, when the ambient temperature next drops near the cloud point of a summer fuel grade while driving, a message is displayed to a vehicle operator indicating that the conditions are suitable for fuel gelling to occur.

20 Claims, 7 Drawing Sheets

DIESEL FUEL GELLING DETERMINATION METHOD

FIELD

The present description relates to systems and methods for determining when the conditions are suitable for fuel gelling to occur in a diesel engine.

BACKGROUND AND SUMMARY

Diesel fuels are chemical mixtures with temperature-dependent properties. One property of particular concern relates to the formation of solid particulate matter at cool operating temperatures. For example, cold temperatures may induce solids dissolved in the fuel to become insoluble, which precipitously causes a cloudy appearance in the fluid fuel. The fuel cloud point refers to the temperature at which dissolved solids are no longer completely soluble in the fuel mixture. Thus, cooling temperatures near the cloud point may cause a second phase to form in the fuel that can lead to the development of engine problems. The solids formed may be wax crystals that are commonly referred to as fuel gels. In this way, fuel gelling may occur when the temperature falls to a point where wax crystals start to form in the fuel. Precipitous accumulation in the fuel may cause problems by plugging the fuel filter, fuel line, injector and/or the fuel system in general, which causes engine damage that prevents the engine from starting or running.

Previous methods and systems for detecting wax formation in a diesel fuel tank are based on determining one or more temperatures in the fuel tank via the placement of dedicated sensors therein. For example, WO2012169957 discloses a method of determining waxing of the fuel in the fuel tank using a first temperature sensor to find the temperature at a first region in a fuel tank and a second sensor to determine the temperature at a second region in the fuel tank. Then, the difference between both sensor temperatures is compared to a limiting value to determine if waxing of fuel in tank has occurred. Alternatively, JP2013068195 describes an abnormality detection apparatus of a fuel filter using a method that determines fuel filter clogging via pressure sensors provided before the inlet and after the outlet of the fuel filter. Then, in response to fuel gelling, a pressure difference develops that is used to indicate further actions for preventing fuel clogging.

The inventors have recognized issues with such approaches and herein describe a fuel gelling determination method based on ambient conditions in the vicinity of a vehicle. The approaches described further include displaying a driver notification specifying a potential need for fuel additives due to fuel gelling responsive to past ambient temperatures and current ambient temperatures. In one particular example referred to as the first embodiment, the method comprises measuring and storing one or more ambient air temperatures on-board the vehicle at a pre-determined interval, such as at each mile. Then, at a fuel refill event the method includes calculating an average ambient temperature based on at least a portion of the stored ambient air temperatures, wherein the determination of the temperature allows for characterizing a fuel grade based on a comparison of the calculated average ambient temperature to a first reference temperature selected to indicate that favorable fuel gel forming conditions exist. As described in greater detail below, the fuel grade may be characterized as a summer grade of fuel that is susceptible to gel formation when the calculated average ambient air temperature exceeds the first reference temperature whereas the fuel is characterized as a winter fuel grade when the average temperature falls below the threshold. In this way, the fuel gelling determination method uses the ambient conditions detected near the vehicle to determine a potential for fuel gel formation within the fuel system, and notifies a vehicle operator of the conditions via a message sent to a display. The technical result can be achieved since fuel gel formation can be prevented by addition of a diesel additive into the fuel. A second embodiment further describes a fuel gelling determination method for use during vehicle operation.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
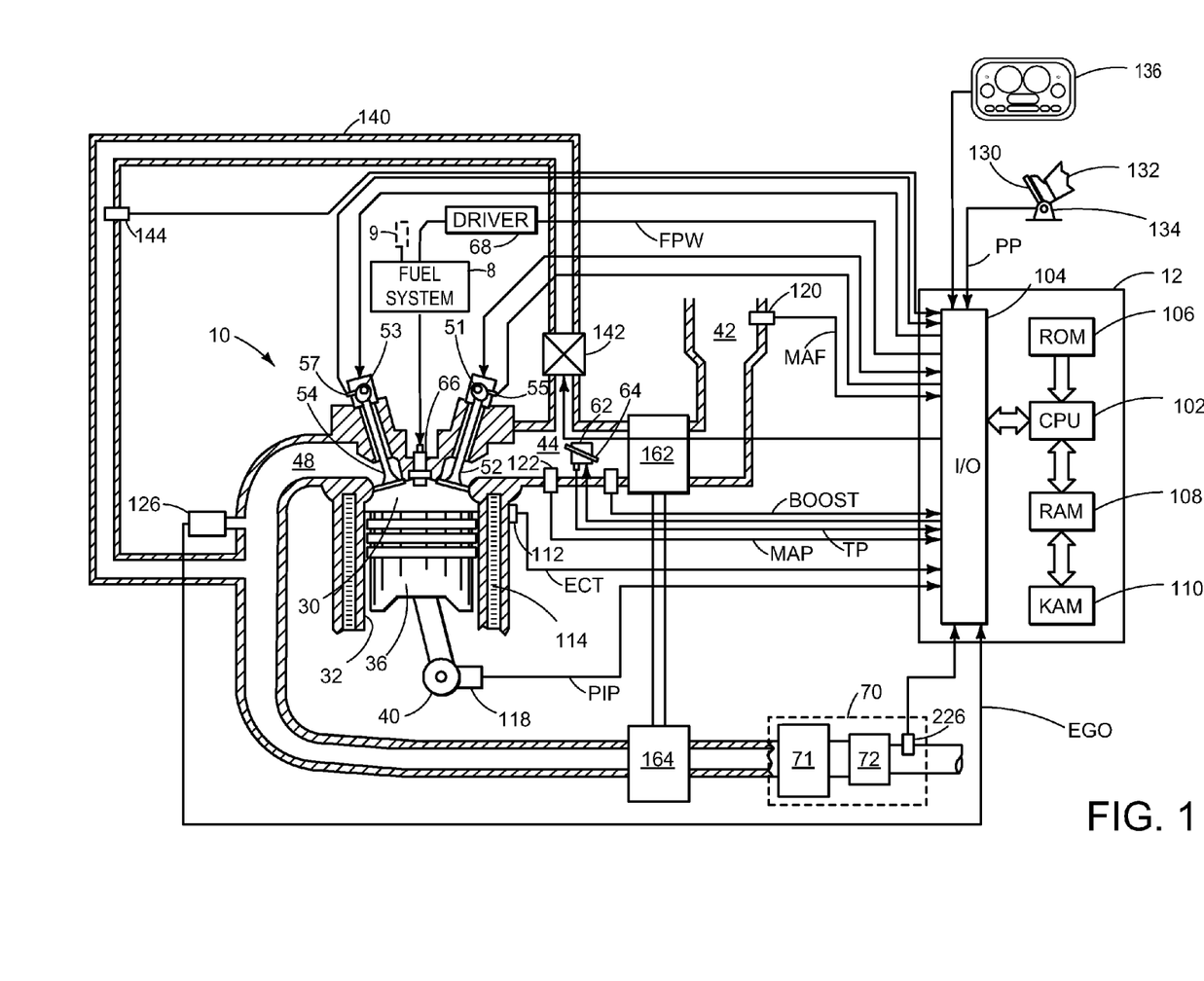
FIG. 1 illustrates an example internal combustion engine.
Figure 2:
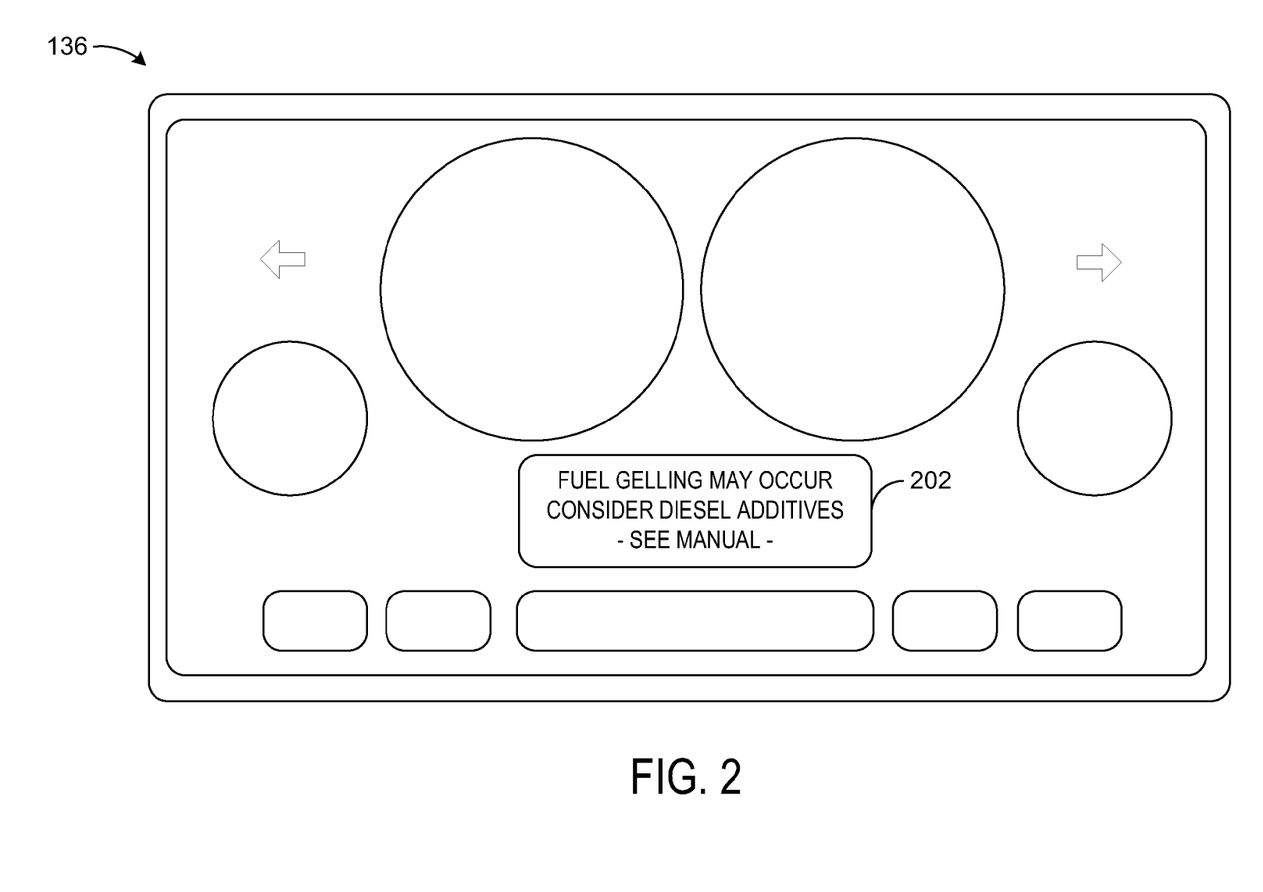
FIG. 2 depicts an example instrument panel to illustrate an example message displayed to a vehicle operator.
Figure 3:
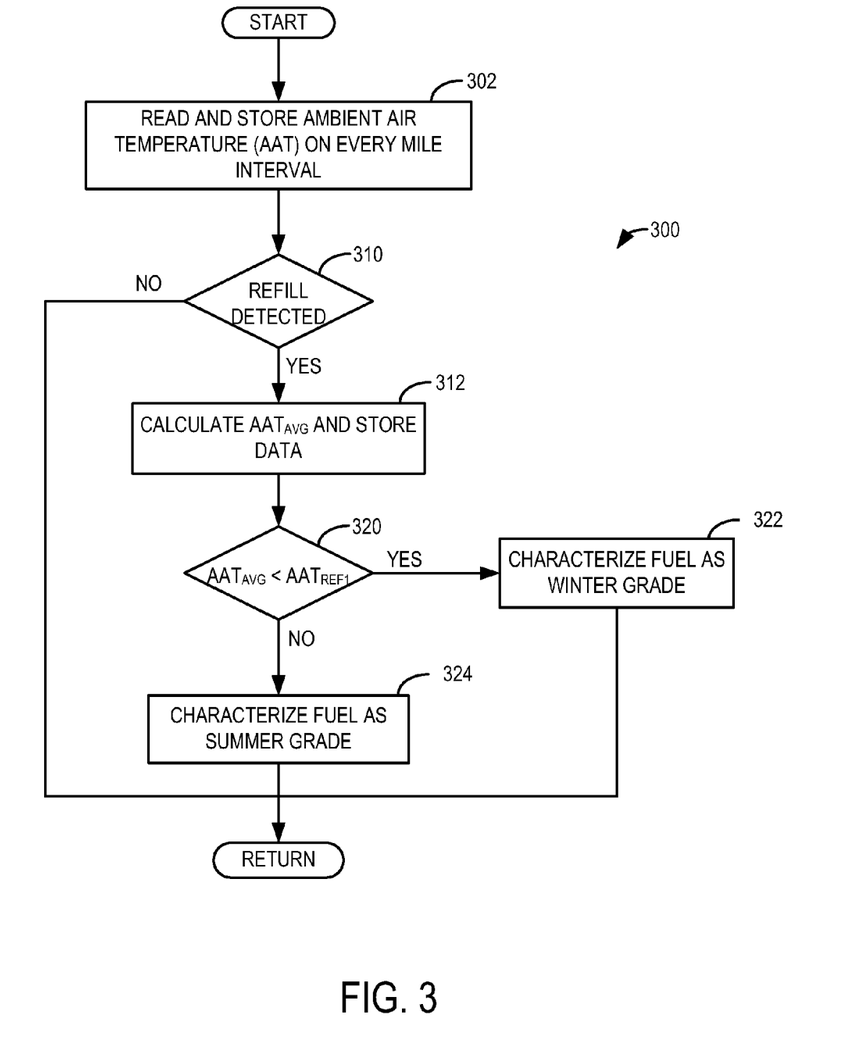
FIG. 3 shows an example flow chart illustrating a routine for characterizing a fuel grade based on the average ambient air temperature according to a first embodiment of the method.
Figure 4:
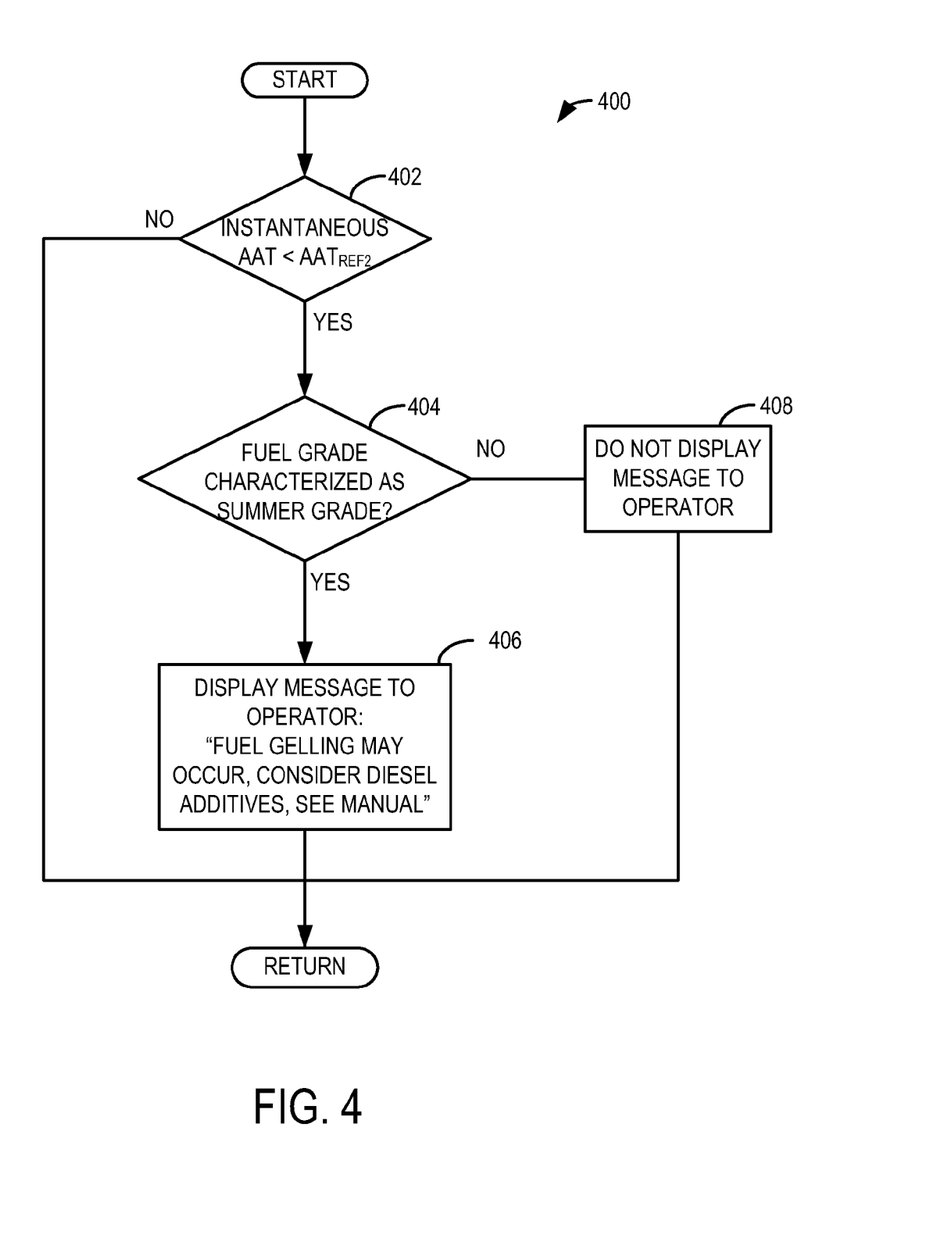
FIG. 4 shows an example flow chart illustrating a routine for determining whether the conditions are suitable for fuel gelling to occur based on the characterization of FIG. 3.
Figure 5:
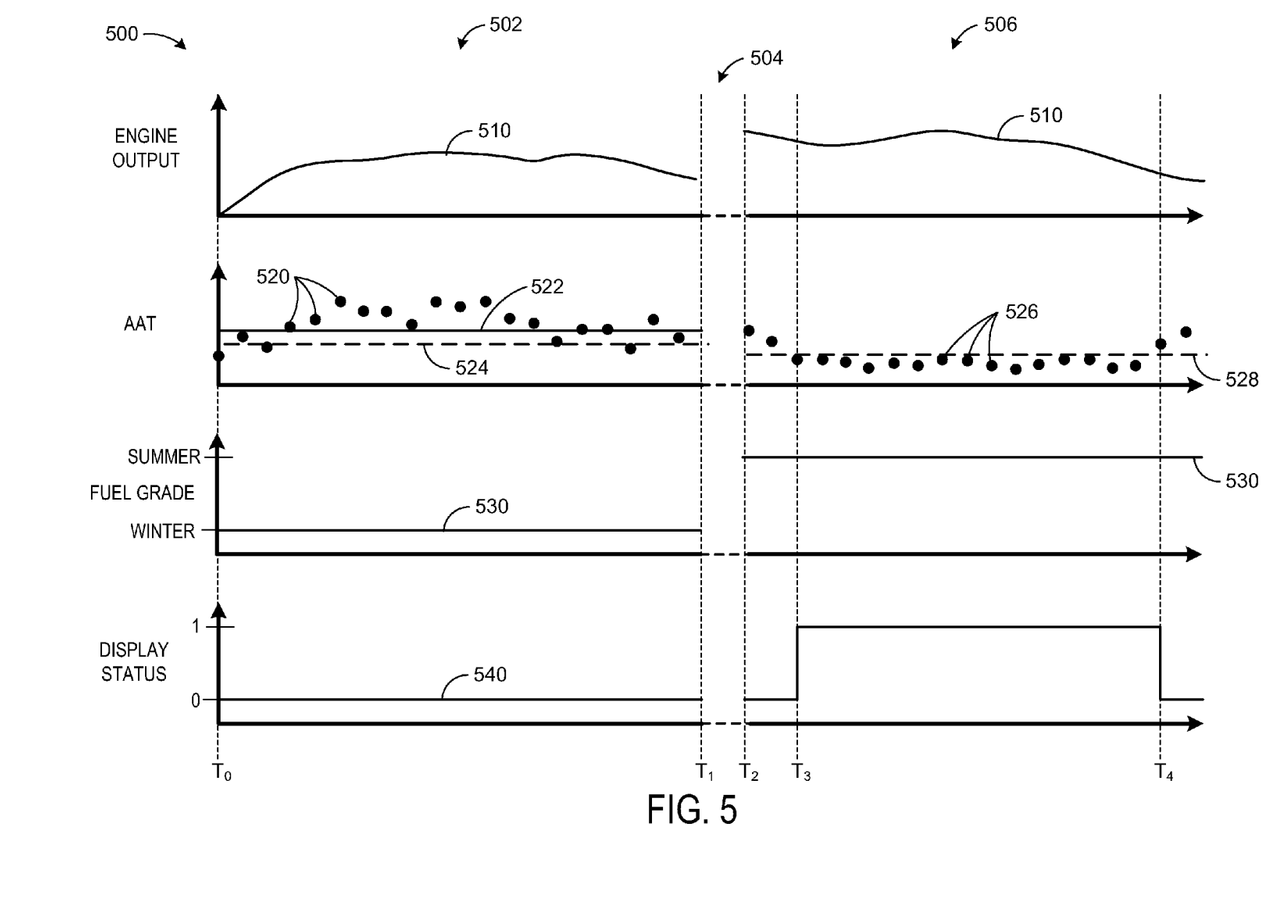
FIG. 5 depicts an example vehicle operating sequence in accordance with the first embodiment to illustrate one implementation of the fuel gelling determination method.
Figure 6:
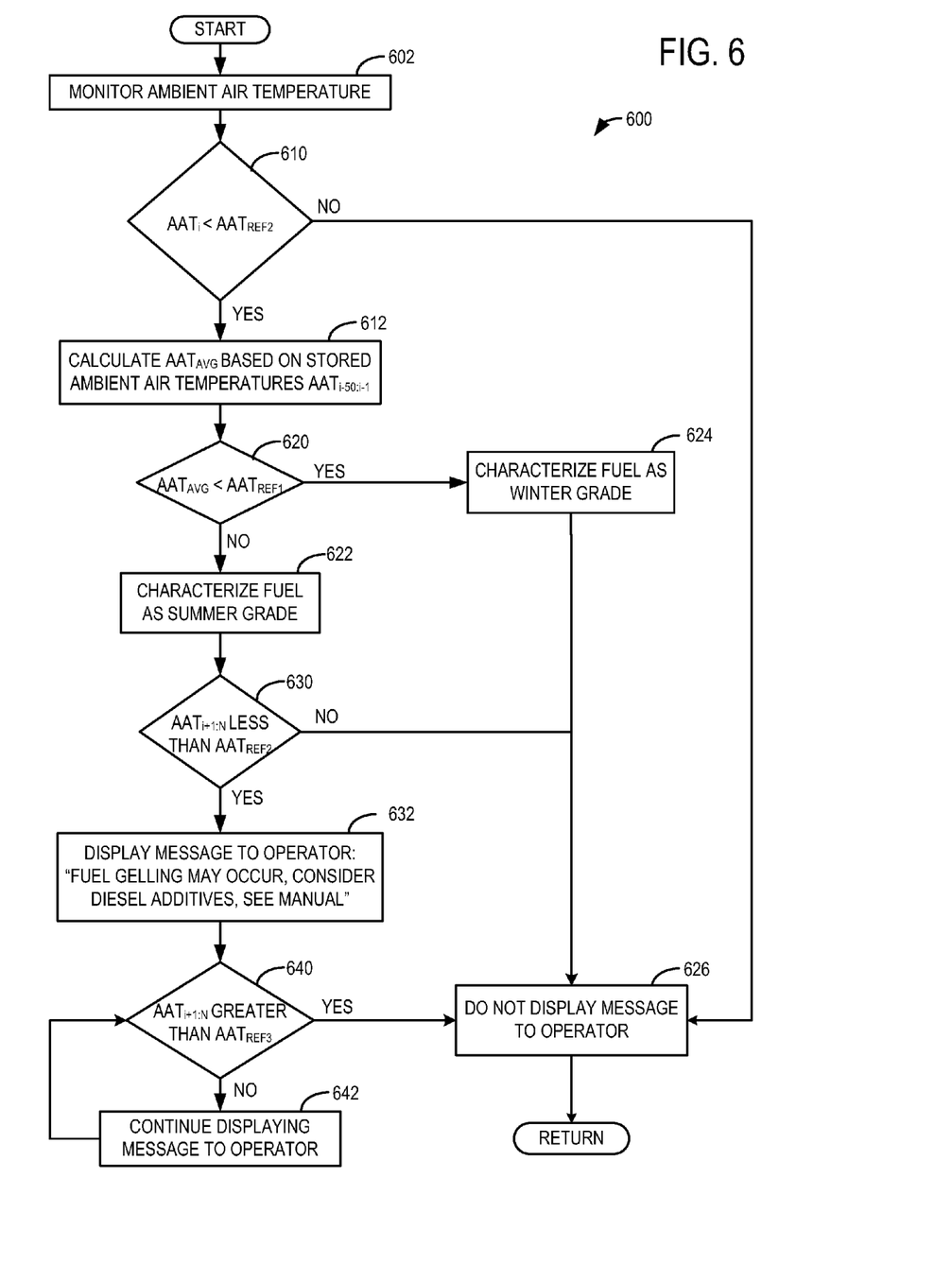
FIG. 6 shows an example flow chart illustrating a routine for determining whether the conditions are suitable for fuel gelling to occur according to a second embodiment.
Figure 7:
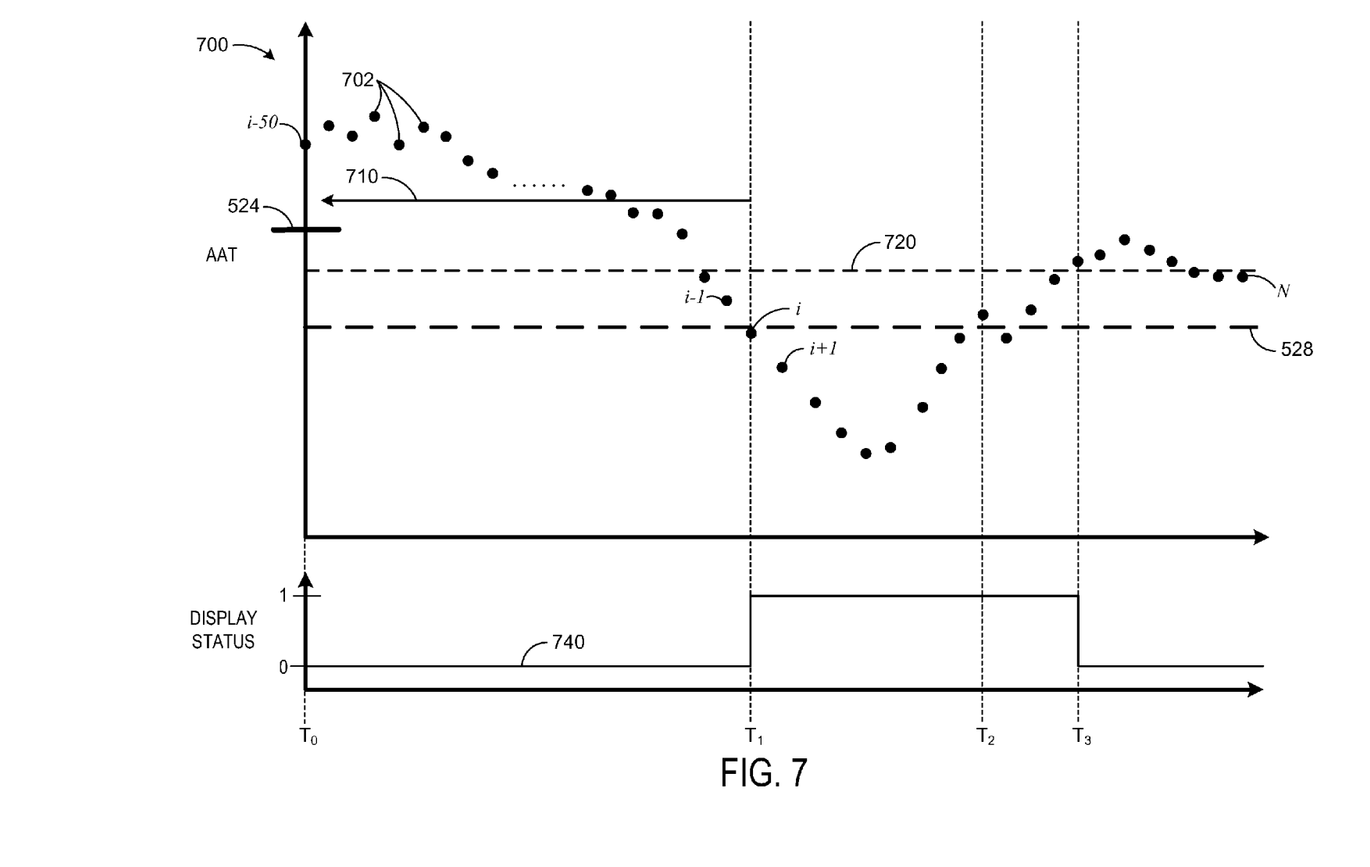
FIG. 7 depicts an example vehicle operating sequence in accordance with the second embodiment to illustrate another implementation of the fuel gelling determination method.

The following description relates to fuel gelling determination methods and systems thereof for identifying and displaying a message to a vehicle operator that the conditions are suitable for fuel gelling to occur, such as in the example engine of FIG. 1 that is communicated via the instrument panel of FIG. 2. Calibrated measures like mixing a diesel additive into the fuel may then be taken to prevent fuel gel formation based on the fuel gelling conditions identified. In one particular example referred to as the first embodiment, at a fuel refill event the average ambient air temperature is calculated over the last fifty miles that is used to characterize the fuel as either a summer or winter grade of fuel. Then, upon continuing driving, the instantaneous ambient temperature is monitored for a drop in temperature near the cloud point of a summer grade of fuel that allows for the identification of conditions suitable to fuel gel formation. As such, FIGS. 3-4 show example flow charts illustrating routines for determining whether the conditions are suitable for fuel gelling to occur according to the first embodiment while FIG. 5 depicts an exemplary vehicle operating sequence according to the method. In an alternate embodiment, a fuel gelling determination is made during the engine drive cycle rather than at a refill event. For example, the method according to the second embodiment allows for a fuel gelling determination to be made in real-time as the vehicle travels along a route where temperature fluctuations may occur near the cloud point of the fuel that put the vehicle at risk for fuel gelling. Therefore, FIG. 6 shows an example flow chart illustrating a routine for determining fuel gelling according to the second embodiment, and FIG. 7 depicts an example vehicle operating sequence according to the method.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Instrument panel 136 is visible to vehicle operator 132 for displaying one or more messages according to the methods.

Combustion chamber 30 (also referred to as a cylinder) of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein. Fuel injection may be via a common rail system, or other such diesel fuel injection systems. Fuel may be delivered to fuel injector 66 by a high pressure fuel system 8 including a fuel tank, a fuel pump, and a fuel rail. In some embodiments, a fuel additive storage vessel 9 for storing a fuel additive may be included and configured to allow the addition of a fuel additive into fuel system 8 when conditions suitable for fuel gel formation are identified. For example, storage vessel 9 may be in fluid communication with a fuel storage tank that stores diesel fuel on-board the vehicle. With this arrangement, controller 12 may be configured to introduce an amount of the fuel additive into the fuel system based on the extent of fuel gel predicted based on the conditions identified. As one example, the amount of fuel additive mixed into the fuel to prevent fuel gelling may be increased based on the extent of the ambient air temperature below a temperature threshold while the conditions are suitable for formation of the fuel gel. In this way, the diesel vehicle may be further configured to actuate the fuel additive introduced into the fuel system based on an extent of the instantaneous ambient air temperature below the second reference temperature while conditions are suitable for fuel gel formation.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR valve 142. Further, an EGR sensor 144 may be arranged within the EGR passage that provides an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. While FIG. 1 shows a high pressure EGR system, additionally, or alternatively, a low pressure EGR system may be used where EGR is routed from downstream of a turbine of a turbocharger to upstream of a compressor of the turbocharger.

As such, Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control system 70 is shown arranged along exhaust passage 48 downstream of exhaust gas sensor 126. System 70 may be a selective catalytic reduction (SCR) system, three way catalyst (TWC), NOx trap, various other emission control devices, or combinations thereof. For example, system 70 may be an SCR system which includes an SCR catalyst 71 and a diesel particulate filter (DPF) 72. In some embodiments, DPF 72 may be located downstream of the catalyst (as shown in FIG. 1), while in other embodiments, DPF 72 may be positioned upstream of the catalyst (not shown in FIG. 1). Emission control system 70 may further include exhaust gas sensor 226. Sensor 226 may be any suitable sensor for providing an indication of a concentration of exhaust gas constituents such as a $NO_R$, $NH_3$, or EGO sensor, for example. Further, in some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed. As elaborated herein, controller 12 may receive input data from various sensors, process the input data, and trigger various actuators in response to the processed input data based on instruction or code programmed therein corresponding to one or more routines. Example control routines are described herein with regard to FIGS. 3-4 and FIG. 6.

As described above, FIG. 1 shows only one cylinder of a multi-cylinder engine, and each cylinder may similarly include its own set of intake/exhaust valves, fuel injector, spark plug, etc.

FIG. 2 depicts instrument panel 136 in greater detail to illustrate how the message displayed may be sent to a vehicle operator to communicate that the vehicle is being operated under conditions suitable for the formation of a fuel gel. In this way, the methods described include displaying a driver notification specifying a potential need for fuel additives due to fuel gelling responsive to fuel grade and current ambient temperatures. As one example, display message 202 may communicate the message while also instructing the vehicle operator to consider mixing an additive into the fuel according to a protocol designed to prevent fuel gel formation. Therefore, display message 202 may communicate the message "Fuel Gelling May Occur, Consider Diesel Additives, —See Manual—", as shown in FIG. 2. However, this is non-limiting and other messages and other message formats are possible as long as the fuel gelling conditions identified are communicated to the operator. For simplicity, the method is described including a protocol that is summarized in a manual stored on-board the vehicle that prevents fuel gel formation when executed. Herein, the fuel gel formation is prevented by mixing an additive into the fuel via manufacturer recommended guidelines. For instance, the protocol may comprise a table of possible additives that are likely to be found on the open market (e.g., at a vehicle service station) that can prevent fuel gel formation when mixed into the fuel system. The table may also include the amount (e.g., volume of additive) to be mixed into the fuel based on the fuel gelling conditions identified.

Although the methods are described based on notifications made using a vehicle instrument panel, such as instrument panel 136, other embodiments are conceived where the fuel gelling conditions are communicated using other means. For example, controller 12 may alternatively and/or additionally be configured to send a message to a vehicle operator over a network. In this way, the message may delivered, e.g., via a text message sent to a cellular telephone of the vehicle operator indicating the fuel gelling conditions. As another example, the fuel gelling conditions may be sent to a network based account associated with the vehicle. Thus, a fleet operator located remotely from the vehicle may be informed of the fuel gelling conditions and use the information to prevent the fuel gelling or even as a tool to record the history of the vehicle in case potential damages arise at a later point in time due to the fuel gelling conditions.

FIGS. 3 and 4 show example flow charts to illustrate routines for characterizing a fuel grade and determining whether the conditions are suitable for fuel gelling according to the first embodiment. Then, FIG. 5 depicts an example vehicle operating sequence in accordance with the first embodiment to illustrate one implementation of the fuel gelling determination method. According to the first embodiment, at a fuel refill event, an average ambient temperature is calculated over a pre-determined interval. For example, the average ambient temperature may be calculated over the last fifty miles prior to the fuel refill event. As such, controller 12 may be configured to read and store one or more ambient air temperatures (AAT) determined by a temperature sensor into memory, e.g., at each mile interval. As such, the pre-determined interval is a unit of distance comprising one mile, and the one or more ambient air temperatures included in the calculation are measured and stored over a total distance comprising fifty miles. However, this is non-limiting and in other embodiments the pre-determined interval may be a unit of time, e.g., comprising one minute, and the one or more ambient air temperatures included in the calculation may be measured and stored over a total time duration comprising, e.g., one hour. Although the method is described based on past ambient temperatures sensed by the vehicle, in other embodiments, the fuel grade may be characterized by alternate measures. For example, alternate arrangements may include characterizing the fuel grade based on past ambient temperatures communicated to a vehicle navigation system from weather data, e.g., weather data sent to the vehicle over a network connection. When configured in this way, the fuel grade may be determined via a comparison of an average ambient air temperature computed from weather data collected in a vicinity of the vehicle and a first reference temperature selected to indicate favorable fuel gel forming conditions in the manner already noted.

Characterization of the fuel grade as a summer or winter grade of fuel aids in determining whether the fuel is susceptible to the forming a fuel gel during the engine drive cycle, for example, when the ambient temperature decreases substantially when driving after a refill event. As noted above, fuel gelling is when the temperature drops down to a point where wax crystals start to form in the fuel, e.g., as a result of the formation of one or more solid precipitates. The cloud point of a fluid fuel is the temperature at which dissolved solids are no longer completely soluble in the fluid, which leads to the formation of precipitates as a second phase that produces a cloudy appearance in the fuel. Precipitous solid materials pose problem to engine systems since their accumulation can plug a fuel filter, fuel line, and/or injector and thereby prevent the engine from starting or running Such problems may be particularly problematic under cooler operating conditions when the ambient temperature while driving drops near or below the cloud point of the fuel used. When a summer grade of fuel is present in the fuel system, the potential for fuel gelling problems is particularly problematic.

Federal emissions regulations mandate the reformulation of fuels, such as gasoline fuel, sold at pumps to reduce the content of toxic and ozone-forming compounds in vehicle emissions. For example, to reduce the emission of volatile organic compounds (VOC), fuels sold in southern areas (e.g., areas categorized under ASTM class B) may be required to have a lower Reid vapor pressure (RVP) as compared to fuels sold in northern areas (e.g., areas categorized under ASTM class C) during summer months. Specifically, the differences in climate between the two types of areas may require a corresponding difference in the gasoline fuel volatility to achieve the same emissions effect. As such, based on the fuel composition, the fuel stored in the fuel tank, and used in the engine, may have a varying volatility.

A number of fuel parameters, including fuel volatility, impact vehicle emissions as well as the susceptibility to fuel gel formation. However, other fuel parameters like the introduction of one or more fuel additives may also affect the susceptibility to fuel gel formation including the Reid vapor pressure (RVP) of the fuel, the fuel oxygen content, benzene and aromatics content, as well as the presence of sulfur, T90 (or E300), olefins, and T50 (or E200). To control the emissions of volatile organic compounds (VOC), fuel RVP and oxygen specifications have been mandated by the EPA. For example, fuels sold during high ozone (or summer) seasons (that is, from June 1 through September 15), are required to have an RVP of no more than 7.2 psi in southern areas (that is, VOC control region 1, or ASTM class B during summer) and 8.1 psi in northern areas (that is, VOC control region 2, or ASTM class C during summer). The difference in climate between the two areas requires a corresponding difference in fuel (e.g., gasoline) volatility to achieve the same emissions effect. As such, the high ozone season is selected to be June 1 through September 15 by the EPA as most ozone violations occur during this period. Since fuels with higher RVP evaporate more easily than fuels with lower RVP, by mandating a fuel with a lower RVP during summer seasons, the VOC emissions of the summer-grade fuel can be improved, and ozone violations reduced.

Furthermore, according to the methods described herein, a fuel grade may be assigned to a fuel based on the ambient conditions surrounding the vehicle as one means of determining whether the fuel has the potential for forming a fuel gel that can plug the fuel system. The propensity for a fuel to form a gel may depend on the amount and/or concentration of one or more chemical components within the fuel to form a solid precipitate or wax. As one example, a dissolved solid may not be completely soluble which causes the formation of a precipitate or second phase that produces a cloudy appearance in the fuel. As another example, one or more chemical components may react, for instance, in a cross-linking reaction to form an aggregate of sufficient size to form a precipitate or second phase that produces a cloudy appearance in the fuel. Such reactions may be temperature dependent, thus, the propensity for a fuel to form a gel may depend on whether a temperature has increased or decreased substantially.

Although the methods described characterize a fuel grade without explicit knowledge of the fuel grade added at the refill event (e.g., addition of a summer or winter grade), in some instances the fuel type may be known to the operator. Therefore, alternate embodiments are possible that store, for example, a GPS location at the refueling point along with the grade of fuel added. Then, the vehicle may be configured to synchronously communicate with a database over a network in order to store information about the vehicle. In this way, GPS locations may be linked to customer complaints of fuel gelling and/or additional fuel issues such as, for instance, water in the fuel that may allow for the identification of suspect fuel stations whose facilities and/or practices put diesel vehicles at risk for additional damage. Storing a calendar date along with the information described further allows for accurate assessments of summer or winter blend fuels to be made. Linkage to the database then enables a more detailed determination, e.g., using a lookup table to identify fueling stations by region in addition to the type of fuel added and date of refueling. Alternatively, if a winter grade of fuel is added to the tank, an operator may opt to override the methods manually since fuel gel formation may not be expected based on the fuel type added into the fuel tank. As still another example, in some instances, a gas pump at a refueling station may be configured to transmit information like the fuel grade to a vehicle that is configured to receive the information. With these arrangements, the information may be received in a vehicle from a fuel station during past refueling events, the information received being from one of a manual fuel grade entry and a gas pump configured to transmit the information to the vehicle.

Turning to a description of the method according to the first embodiment, FIG. 3 shows an example flow chart of method 300 for characterizing the fuel grade based on the average ambient air temperature. At 302, method 300 includes measuring and storing one or more ambient air temperatures on-board the vehicle at a pre-determined interval. For example, controller 12 may be programmed with instructions to read and store into a first-in first-out buffer the ambient air temperatures at an interval of one mile. Then, at 310, method 300 includes detecting a refill event, e.g., via a fuel level sensor that detects a fluid level in the fuel tank. If a fuel refill event is detected, at 312, method 300 includes calculating an average ambient air temperature based on at least a portion of the stored ambient air temperatures, for example, using ambient air temperatures from the previous 50 miles and storing a date associated with the refill event. With this arrangement, controller 12 may be configured to characterize a summer or winter grade of fuel on-board the vehicle. Conversely, if a refill event is not detected, the method may continue to monitor and store the ambient air temperatures during the engine drive cycle.

A first reference temperature is included to indicate whether favorable fuel gel forming conditions, or the increased propensity for forming a fuel gel, exist. Thus, an average ambient air temperature above the first reference temperature may indicate that the volatility of a fuel has increased such that the concentrations of chemical components remaining in the fluid fuel are affected. For example, when the ambient temperature rises to a level above the first reference temperature or threshold, which may be calibrated to the specific type of fuel used on-board the vehicle, the fuel volatility that also depends on temperature, may increase for a one or more chemical components present so the fluid fuel remaining in the fuel tank is altered and therefore poses a risk for forming a fuel gel upon cooling. The method thus includes characterizing the fuel grade based on a comparison of the calculated average ambient air temperature and the first reference temperature that is selected to indicate favorable fuel gel forming conditions. As described herein, the fuel grade is characterized as a summer grade of fuel that is susceptible to gel formation when the calculated average air temperature exceeds the first reference temperature whereas the fuel grade is characterized as a winter grade of fuel that is incompatible with gel formation when the calculated average ambient air temperature falls below the first reference temperature.

Continuing with a description of the method, after the refill event, method 300 includes characterizing the fuel based on the calculated average ambient air temperature. As such, at 320, method 300 includes comparing the calculated average air temperature to a reference temperature referred to as the first reference temperature ($AAT_{REF1}$) that is selected to indicate favorable fuel gel forming conditions. If the calculated average ambient air temperature falls below the first reference temperature, at 322, the fuel is characterized as a winter grade of fuel that does not possess a substantial propensity for forming a fuel gel. However, if the calculated average ambient air temperature does not fall below the first reference temperature, for example, because it meets or exceeds the first reference temperature, then the fuel is characterized as a summer grade of fuel that may be at risk for forming a fuel gel regardless of the actual fuel type stored on-board the vehicle.

Then, based on the characterization as either a summer or winter grade of fuel, the method further includes monitoring an instantaneous ambient air temperature during the engine drive cycle to identify when the conditions are suitable for forming the fuel gel. For example, when the ambient temperature while driving drops near the cloud point of summer grade fuel, the propensity for forming a fuel gel is high. Thus, a message on the dash (e.g., instrument panel 136) may be displayed to an operator stating that fuel gelling may occur and further instruct the operator to consider adding a diesel additive to the fuel to prevent the fuel gel formation. As noted above, the protocol for adding the diesel additive may be summarized in a vehicle manual stored on-board the vehicle. For this reason, in some implementations, the message may further include a directive for the operator to see a manual associated with the vehicle. Although the manual is herein described as being stored on-board the vehicle, this is non-limiting and in some instances the manual may be stored remotely from the vehicle, e.g., at a network internet address (or manufacturer website) associated with the particular vehicle and/or fuel used by the vehicle.

FIG. 4 shows an example flow chart of method 400 that illustrates a routine for determining whether the conditions are suitable for fuel gelling to occur. As noted above, a summer grade of fuel may have a high propensity for forming a fuel gel under suitable conditions like a drop in temperature during cold driving conditions. Thus, at 402, method 400 includes measuring an instantaneous ambient air temperature. Then, responsive to a measured instantaneous ambient air temperature falling below a second reference temperature ($AAT_{REF2}$), e.g., within 5% of the cloud point of a fuel while the fuel is characterized as a summer fuel grade may indicate that the conditions are suitable for formation of the fuel gel. For this reason, at 404, method 400 further determines whether the fuel has been characterized as a summer grade of fuel. If the fuel is characterized as a summer grade of fuel while the instantaneous ambient air temperature falls below the second reference temperature, at 406 a message is sent and displayed to a vehicle operator to indicate possible fuel gel formation. Alternatively, if the fuel is characterized as a winter grade of fuel, no message is displayed to the vehicle operator since a high propensity does not exist for the fuel to form a gel, as shown at 408. Returning to 402, if the instantaneous ambient air temperature does not fall below the second reference temperature, method 400 continue to monitor the ambient conditions in accordance with the methods described during vehicle operation.

To illustrate one implementation of the fuel gelling determination method according to the first embodiment in greater detail, FIG. 5 depicts example vehicle operating sequence 500 along with four plots to schematically illustrate the operating parameters as a function of time in the graphs provided. Time is shown along the x-axis and time increases from left to right. For simplicity, the operating sequence is shown in three parts. Pre-refill region 502 occurs from $T_0$ to $T_1$ and illustrates the operating parameters prior to the refill event. Refill region 504 occurs from $T_1$ to $T_2$ and represents a period of time when the characterization method (e.g., method 300) is carried out to characterize the fuel using data collected while the vehicle was operated in pre-refill region 502. As noted above, the methods may characterize the fuel as either a summer or winter grade of fuel based on the ambient conditions determined. Post-refill region 506 occurs after $T_2$ and illustrates how the operating parameters after the refill event are used to determine whether the conditions are suitable for formation of a fuel gel. For simplicity and clarity, the top plot shows engine output 510 to illustrate vehicle operation during execution of the method. Although engine output 510 is shown in the middle of a drive cycle upon entering refill region 504, the vehicle may be momentarily stopped for a short period in order to refuel the vehicle. The method may be carried out at this point. The second plot temporally shows the ambient air temperature (AAT) as data points collected by the vehicle at the pre-determined interval. Then, the third plot shows exemplary fuel status 530 to illustrate how characterization of the fuel as a summer or winter grade of fuel may occur. The bottom plot shows display status 540 that indicates whether the message is being displayed to the vehicle operator as an alert that fuel gelling may occur.

Returning to the second plot of ambient air temperatures, when a refill event is detected in refill region 504, at least a portion of the ambient air temperatures in pre-refill region 502 may be used to characterize the fuel grade via a calculation of the average ambient temperature. For this reason, example ambient air temperatures 520 are identified in pre-refill region 502. The average ambient air temperature 522 may be calculated based on example ambient air temperatures 520 and further compared to first reference temperature 524. As shown, average ambient air temperature 522 exceeds first reference temperature 524, thus the fuel is characterized as a summer grade of fuel according to method 300. For this reason, after the refill event, fuel status 530 in the third plot is adjusted to reflect the characterization as a summer grade of fuel. Upon continuing the drive cycle in post-refill region 506, controller 12 may be programmed to monitor instantaneous ambient air temperatures 526 to identify when the conditions are suitable for forming the fuel gel. As such, second reference temperature 528, which in some instances may be related to the cloud point of the fuel (e.g., a temperature 5% above the cloud point), may be relied upon to identify when the conditions are suitable for forming the fuel gel. At $T_3$, the instantaneous ambient air temperature drops below second reference temperature 528. In response to the temperature drop below the threshold, and because the fuel has been characterized as a summer grade of fuel that may be at risk for forming a gel (as shown by fuel status 530), controller 12 may make adjustments to display a message on instrument panel 136 that indicates the conditions are suitable for fuel gel formation. Accordingly, display status 540 is adjusted to reflect that the message is being displayed to the vehicle operator. The message may be displayed so long as the measured ambient air temperature falls below second reference temperature 528 (e.g., from $T_3$ to $T_4$). At $T_4$, the ambient temperature rises above second reference temperature 528, and so the display status may again be adjusted to reflect that the fuel no longer poses a high propensity for forming the fuel gel based on the ambient air temperature.

Turning to a second embodiment of the present method, FIGS. 6 and 7 relate to a real-time fuel gel determination method that may be used to indicate suitable conditions for forming the fuel gel during the engine drive cycle as opposed to a refill event as was described with regard to the first embodiment. FIG. 6 shows an example flow chart of a routine for determining whether the conditions are suitable for fuel gelling. Then, FIG. 7 depicts an example vehicle operating sequence to illustrate another implementation of the fuel gelling determination method. As noted already, the second embodiment includes monitoring the ambient air temperature during the drive cycle and in response to a drop in the ambient temperature, e.g., a temperature dropping below the cloud point of a fuel, determining the average ambient air temperature for vehicle operation over a pre-determined interval prior to the drop in temperature. Then, responsive to the drop in ambient temperature, the method characterizes the fuel grade to identify whether a fuel is susceptible to fuel gelling during vehicle operation.

FIG. 6 depicts method 600 that may be a programmable routine stored into a memory unit of controller 12. At 602, method 600 includes monitoring the ambient air temperature around a vehicle. Then, at 610, method 600 further includes comparing measured ambient air temperatures (e.g., as a function of distance or time i, $AAT_i$) to the second reference temperature ($AAT_{REF2}$) to determine a potential for fuel gel formation. For simplicity and clarity, a usage consistent with the first embodiment is adopted so the first and second reference temperatures indicate similar thresholds throughout the descriptions.

If the measured ambient air temperature falls below second reference temperature 528, the conditions may be suitable for fuel gel formation depending on the fuel grade on-board the vehicle, that is, whether the fuel is characterized as a summer or winter grade of fuel. For this reason, at 612, controller 12 may calculate an average ambient air temperature ($AAT_{AVG}$) based on one or more stored ambient temperatures to characterize the grade of the fuel while also determining the potential for fuel gelling. As described above with respect to the first embodiment, controller 12 may use the air temperatures measured at each mile interval over the previous fifty miles prior to the ambient air temperature that falls below second reference temperature 528 (e.g., $AAT_{i-50:i-1}$). However, the interval and duration is non-limiting, and other computational methods like measuring ambient temperatures every minute for an hour are also possible. The measurements may also occur more or less frequently depending on the specific implementation of the method. With this arrangement, controller 12 may be configured to read and store ambient air temperatures during vehicle operation (e.g., using a first-in, first-out buffer) while using the stored data points to calculate the average ambient air temperature. Returning briefly to 610, if the measured ambient air temperature ($AAT_i$) exceeds second reference temperature 528 ($AAT_{REF2}$), fuel gel formation is unlikely. As such, no message is displayed to the vehicle operator since a low potential for fuel gel formation exists, as indicated at box 626. However, method 600 continues monitoring one or more conditions during operation.

Continuing with a description of the method when the measured ambient air temperature falls below second reference temperature 528, at 620, method 600 includes comparing the calculated average ambient air temperature $AAT_{AVG}$ to first reference temperature 524 to characterize the grade of fuel in the fuel system. If $AAT_{AVG}$ does not fall below first reference temperature 524, for instance, because it exceeds the threshold temperature, at 622 the fuel grade is characterized as a summer grade of fuel as described in greater detail above. Conversely, if $AAT_{AVG}$ does fall below first reference temperature 524, at 624 the fuel grade is characterized as a winter grade of fuel that has a low propensity for fuel gel formation. As such, no message is displayed to the vehicle operator, as box 626 indicates.

In the event a fuel is characterized as a summer grade of fuel at 622, method 600 continues to 630 where further ambient air temperatures (e.g., $AAT_{i+1:N}$) are monitored and compared to $AAT_{REF2}$. As long as the ambient air temperature exceeds $AAT_{REF2}$, a low propensity for fuel gelling may exist and so no message is displayed. However, when the ambient temperature does fall below second reference temperature 528, a display message is sent to a vehicle operator, e.g., via instrument panel 136 that indicates fuel gelling may occur, and for the operator to consider adding a diesel additive. As noted above, further instructions may be kept in a manual stored on-board the vehicle. In some embodiments, method 600 may further include a third reference temperature or threshold that is higher than the second reference temperature to allow for hysteresis in the temperature sensor and system. In this way, the message may still be displayed to a vehicle operator even though a temperature rises above the fuel gelling temperature threshold briefly. For this reason, at 640, method 600 includes comparing measured ambient air temperatures to the third reference temperature ($AAT_{REF3}$). Then, if the measured ambient air temperature exceeds the third reference temperature, method 600 proceeds to box 626 by shutting off the message displayed. Conversely, as long as the ambient temperature falls below the third reference temperature, the message may continue to be displayed to the vehicle operator while controller 12 monitors the ambient temperature as a means of determining the potential for fuel gelling during operation, as indicated at box 642. In other words, method 600 may prevent a message displayed from being shut off when the instantaneous ambient temperature exceeds the second reference temperature but falls below the third reference temperature.

FIG. 7 depicts a vehicle operating sequence according to the second embodiment to illustrate another implementation of the fuel gelling determination method described. As shown in operating sequence 700, ambient temperature data 702 may be collected during vehicle operation. Then, controller 12 may be configured to identify low temperature points that fall below second reference temperature 528. As shown, the ith temperature point falling below second reference temperature 528 occurs at $T_1$. Thus, from $T_0$ to $T_1$, no visual display is sent to the vehicle operator, as indicated at 740 where the display status is set to zero. Responsive to the low temperature data point at $T_1$, controller 12 may calculate average ambient temperature 710 for the previous, e.g., 50 data points (or data points i-50 to i-1). Then, the calculated average ambient temperature 710 may be compared to first reference temperature 524 to determine whether the fuel poses a risk for forming a fuel gel. Because average ambient temperature 710 exceeds the first reference temperature 524, according to the methods, the fuel is characterized as a summer grade of fuel, which has the potential for forming a fuel gel. Therefore, display status 740 is set to one and communicates to a vehicle operator (e.g., via instrument panel 136) that conditions exist that are suitable for fuel gelling.

After controller 12 characterizes the fuel grade using the acquired data, after $T_1$, the ambient air temperature AAT is shown falling below second reference temperature 528 for a short duration. Then, at $T_2$, the ambient temperature rises above the second reference temperature 528 briefly. However, because third reference temperature 720 is also present, display status 740 is not updated since the display message is not shut off in response to the temperature rising briefly above the second temperature threshold. Further, at $T_3$, the ambient temperature rises above third reference temperature 720 that is selected to indicate that the fuel exhibits a low potential for forming the fuel gel based on the operating conditions. In response, display status 740 is reset to zero and the message displayed to the vehicle operator is shut off. Thereafter, display of the message may not occur as long as the ambient air temperature exceeds the second reference temperature in the same manner described already.

In this way, the fuel gelling determination methods described use the ambient conditions detected around the vehicle to determine whether a potential for fuel gel formation exists within the fuel system. Advantageously, the methods allow for a message to be displayed to a vehicle operator, which further allows for the addition of a diesel additive into the fuel responsive to the displayed message and thus for preventative measures to be taken to prevent the fuel gel formation.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   measuring ambient temperatures on-board a diesel vehicle during an engine drive cycle;
   responsive to a current ambient temperature below a first reference temperature, determining, via a controller, an average ambient temperature based on the measured ambient temperatures; and
   displaying, via a display communicatively coupled to the controller, a driver notification specifying a potential need for fuel additives due to fuel gelling responsive to the average ambient temperature.

2. The method of claim 1, further comprising characterizing a fuel grade based on the determined average ambient temperature.

3. The method of claim 2, wherein the measured ambient temperatures are stored on-board the diesel vehicle, the average ambient temperature being determined based on at least a portion of the stored ambient temperatures.

4. The method of claim 3, wherein the determined average ambient temperature is compared to a second reference temperature to characterize the fuel grade.

5. The method of claim 4, further comprising characterizing the fuel grade as a summer grade of fuel responsive to the determined average ambient temperature exceeding the second reference temperature and characterizing the fuel grade as a winter grade of fuel responsive to the determined average ambient temperature falling below the second reference temperature.

6. The method of claim 5, further comprising communicating that conditions are suitable for fuel gelling based on the comparison, wherein displaying a driver notification includes communicating a message to a vehicle operator that conditions are suitable for fuel gelling while the current ambient temperature falls below the first reference temperature and the fuel grade is characterized as the summer grade.

7. The method of claim 6, where a third reference temperature based on the first reference temperature is included that prevents a message displayed from being shut off when the current ambient temperature exceeds the first reference temperature but falls below the third reference temperature.

8. The method of claim 7, where the message displayed provides an indication that an additive is to be mixed into a fuel according to a protocol that prevents fuel gelling.

9. A method for a vehicle, comprising:
   characterizing, via a controller, a fuel grade of a fuel of the vehicle;
   measuring current ambient temperatures on-board the vehicle, determining an average ambient temperature based on the measured ambient temperatures; and displaying, via a display communicatively coupled to the controller, a driver notification specifying a potential need for fuel additives due to fuel gelling responsive to the fuel grade and the average ambient temperature.

10. The method of claim 9, wherein characterizing the fuel grade is based on past ambient temperatures sensed by the vehicle, the fuel grade determined via a comparison of an average ambient temperature calculated based on the past ambient temperatures and a first reference temperature selected to indicate favorable fuel gel forming conditions, and wherein the fuel grade is characterized as a summer grade of fuel that is susceptible to gel formation when the average ambient temperature exceeds the first reference temperature.

11. The method of claim 10, further comprising characterizing the fuel grade as a winter grade of fuel that is incompatible with gel formation when the average ambient temperature falls below the first reference temperature, wherein the method includes not displaying the driver notification when the fuel grade is characterized as a winter fuel grade.

12. The method of claim 11, further comprising storing the past ambient air temperatures at a pre-determined interval on-board the vehicle, and characterizing the fuel grade based on the stored past ambient temperatures at a fuel refill event.

13. The method of claim 12, further comprising displaying the driver notification indicating that conditions are suitable for fuel gelling responsive to the current ambient temperature falling below a second reference temperature while the fuel grade is the summer fuel grade, the notification being shut off when the current ambient temperature exceeds the second reference temperature.

14. The method of claim 13, wherein the displayed driver notification is shown on an instrument panel, and the notification indicates that an additive is to be mixed into the fuel according to a protocol that prevents fuel gelling.

15. The method of claim 9, wherein characterizing the fuel grade is based on past ambient temperatures communicated to a vehicle navigation system of the vehicle from weather data, the fuel grade determined via a comparison of an average ambient air temperature calculated based on the past ambient temperatures in a vicinity of the vehicle and a first reference temperature selected to indicate favorable fuel gel forming conditions, and wherein the fuel grade is characterized as a summer grade of fuel that is susceptible to gel formation when the average ambient air temperature exceeds the first reference temperature.

16. The method of claim 9, wherein characterizing the fuel grade is based on information received in the vehicle from a fuel station during past refueling events, the information received being from one of a manual fuel grade entry and a gas pump configured to transmit the information to the vehicle.

17. A diesel vehicle configured with a fuel gelling determination method, the method comprising:
  measuring and storing one or more ambient air temperatures on-board the diesel vehicle at a pre-determined interval,
  calculating an average ambient air temperature based on at least a portion of the stored ambient air temperatures,
  characterizing a fuel grade based on a comparison of the calculated average ambient air temperature and a first reference temperature selected to indicate favorable fuel gel forming conditions, the fuel grade being characterized as a summer grade of fuel that is susceptible to gel formation when the calculated average ambient air temperature exceeds the first reference temperature, and
  further measuring an instantaneous ambient air temperature and responsive to a measured instantaneous ambient air temperature below a second reference temperature while the fuel is characterized as a summer fuel grade, sending a message to a vehicle operator indicating that conditions are suitable for fuel gel formation.

18. The diesel vehicle of claim 17, further including an instrument panel for communicating a message to an operator while the instantaneous ambient air temperature falls below the second reference temperature, the message indicating that conditions are suitable for fuel gel formation and to mix an additive into the fuel according to a protocol that prevents fuel gel formation.

19. The diesel vehicle of claim 17, further including a fuel additive storage vessel that is configured to allow addition of a fuel additive into a fuel system when conditions suitable for fuel gel formation are identified.

20. The diesel vehicle of claim 19, further including a controller configured to actuate the fuel additive introduced into the fuel system based on an extent of the instantaneous ambient air temperature below the second reference temperature while conditions are suitable for fuel gel formation.

* * * * *